(12) United States Patent
Violett

(10) Patent No.: US 8,026,644 B2
(45) Date of Patent: Sep. 27, 2011

(54) ELECTRIC PROPULSION SYSTEM USEFUL IN JET-TYPE MODEL AIRPLANES AND UAVS

(76) Inventor: Robert S. Violett, Winter Springs, FL (US)

(*) Notice: Subject to any disclaimer, the term of this patent is extended or adjusted under 35 U.S.C. 154(b) by 236 days.

(21) Appl. No.: 12/100,216

(22) Filed: Apr. 9, 2008

(65) Prior Publication Data

US 2009/0272854 A1    Nov. 5, 2009

Related U.S. Application Data

(60) Provisional application No. 60/910,933, filed on Apr. 10, 2007.

(51) Int. Cl.
*H02K 9/00* (2006.01)
*H02K 5/18* (2006.01)
*H02K 5/20* (2006.01)

(52) U.S. Cl. ................. 310/64; 310/58; 310/59; 310/89

(58) Field of Classification Search .................... 310/64, 310/58, 59, 89
See application file for complete search history.

(56) References Cited

U.S. PATENT DOCUMENTS

| | | | | |
|---|---|---|---|---|
| 3,715,610 | A * | 2/1973 | Brinkman | 310/54 |
| 4,307,857 | A * | 12/1981 | Godbersen | 244/54 |
| 4,369,149 | A * | 1/1983 | Violett | 261/44.2 |
| 4,557,107 | A * | 12/1985 | Violett et al. | 60/269 |
| 4,593,288 | A * | 6/1986 | Fitzpatrick | 343/705 |
| 4,685,289 | A * | 8/1987 | Violett et al. | 60/269 |
| 4,993,663 | A * | 2/1991 | Lahti et al. | 244/53 B |
| 5,143,329 | A * | 9/1992 | Coffinberry | 244/209 |
| 5,535,967 | A * | 7/1996 | Beauchamp et al. | 244/209 |
| 5,810,284 | A * | 9/1998 | Hibbs et al. | 244/13 |
| 6,157,104 | A * | 12/2000 | Yokozawa et al. | 310/58 |
| 6,177,740 | B1 * | 1/2001 | Burns | 310/68 R |
| 6,384,494 | B1 * | 5/2002 | Avidano et al. | 310/58 |
| 6,729,575 | B2 * | 5/2004 | Bevilaqua | 244/12.3 |
| 6,784,574 | B2 * | 8/2004 | Turner et al. | 310/58 |
| 6,820,411 | B2 * | 11/2004 | Pederson et al. | 60/229 |
| 7,053,510 | B2 * | 5/2006 | Doi | 310/89 |
| 7,122,923 | B2 * | 10/2006 | Lafontaine et al. | 310/58 |
| 7,129,604 | B1 * | 10/2006 | Wang | 310/63 |
| 2001/0024075 | A1* | 9/2001 | Caamano | 310/254 |
| 2003/0094867 | A1* | 5/2003 | Wolters | 310/64 |
| 2003/0173839 | A1* | 9/2003 | Torii et al. | 310/52 |
| 2004/0084982 | A1* | 5/2004 | Suzuki | 310/89 |
| 2004/0145253 | A1* | 7/2004 | Browne et al. | 310/58 |
| 2006/0022529 | A1* | 2/2006 | De Filippis et al. | 310/58 |
| 2006/0038452 | A1* | 2/2006 | Lesak | 310/90 |
| 2006/0158049 | A1* | 7/2006 | Suzuki et al. | 310/52 |
| 2006/0181162 | A1* | 8/2006 | Pierret et al. | 310/58 |
| 2006/0261686 | A1* | 11/2006 | Rutsyamuka | 310/53 |

* cited by examiner

*Primary Examiner* — Quyen Leung
*Assistant Examiner* — Alex W Mok
(74) *Attorney, Agent, or Firm* — Michael L. Leetzow, P.A.

(57) ABSTRACT

A power plant for a jet-type model airplanes and UAVs includes an electric motor and a cover. The cover receives a portion of the electric motor and a sleeve into which the electric motor is inserted. The sleeve has a plurality of fins to dissipate heat and create openings into the cover. Air from the fan rotor passes through the openings to cool an electronic speed control member and exits a rear opening in the cover. The cover may also have additional openings for air to enter into the cover.

19 Claims, 5 Drawing Sheets

ELECTRIC PROPULSION SYSTEM USEFUL IN JET-TYPE MODEL AIRPLANES AND UAVS

CROSS-REFERENCE TO RELATED APPLICATIONS

This application claims priority to and incorporates by reference herein in its entirety the following: U.S. Provisional Patent Application Ser. No. 60/910,933, filed Apr. 10, 2008.

BACKGROUND OF THE INVENTION

1. Field of the Invention

The present invention relates generally to an electric engine and method for model airplanes and more particularly to electric engines for jet-type model airplanes and UAVs (unmanned aerial vehicles) that provide cooling air for the engines and other electronic components to avoid overheating of those components.

2. Technical Background

Engines used for jet-type model airplanes and UAVs include both fuel-based and electric. The fuel based engines can typically be flown for as long as the aircraft has fuel. However, if there is a problem with these aircraft, they may cause fires upon impact. The electric engines have been susceptible to overheating and are more limited in their duration of use, particularly at full power. Usually, these limitations are because they have not been sufficiently cooled, which limits their use when compared to those engines using fuel, due to overheating. Even when the aircraft lands, the operator usually must continue to run the engines at a reduced output so that the engines can cool before they can be shut down. These issues related to the fuel-based engines and the electric engines limit the operation of the aircraft.

Therefore, a new electric engine and related components and their assembly and configuration is needed that obviates these issues and provides a long term use of the electric engines for jet-type model airplanes and UAVs in particular.

SUMMARY OF THE INVENTION

Disclosed herein is a power plant for a model jet airplane that includes an electric motor having a plurality of cooling fins circumferentially surrounding the electric motor, each of the cooling fins having an outer surface, a cover having an elongated opening extending between a front end and a rear end, the front end configured to receive the electric motor and cooling fins therein, the outer surface of the cooling fins engaging at least a portion of an inner surface of the cover, the rear end of the cover having an opening, and an electronic speed control member electrically connected to the electric motor and disposed within the longitudinal opening of the cover, wherein during operation air enters the front end of the cover between each of the cooling fins and a third opening in the cover between the front and rear ends to cool the electronic speed control member and exits the opening in the rear end of the cover.

In other embodiments, the cover has airfoil-shaped pylon extending radially outward from the cover.

In some embodiments, the electric motor is inserted into a metallic sleeve and the metallic sleeve has a plurality of cooling fins around an exterior.

In other embodiments, transfer grease is disposed between the electric motor and the metallic sleeve.

In other embodiments, the insulator is capable of limiting longitudinal movement of the contact assembly relative to the body.

In another aspect, a power plant for a model jet airplane is disclosed, the power plant including an electric motor having a plurality of cooling fins circumferentially surrounding the electric motor, each of the cooling fins having an outer surface, a cover having an elongated opening extending between a front end and a rear end, the front end configured to receive the electric motor and the plurality of cooling fins therein, a portion of the outer surface of the cooling fins engaging at least a portion of an inner surface of the cover creating a plurality of openings at the front end of the cover, and the rear end of the cover having an opening, and an electronic speed control member electrically connected to the electric motor and disposed within the longitudinal opening of the cover.

In another aspect, a power plant for a model jet airplane is disclosed, the power plant includes an electric motor having a plurality of cooling fins circumferentially surrounding the electric motor, each of the cooling fins having an outer surface, an electronic speed control member electrically connected to the electric motor, and a plurality of blades operationally connected to the electric motor, wherein the plurality of cooling fins act as ports for air from the plurality of blades to cool the electronic speed control member during operation.

Additional features and advantages of the invention will be set forth in the detailed description which follows and, in part, will be readily apparent to those skilled in the art from that description or recognized by practicing the invention as described herein, including the detailed description which follows, the claims, and the appended drawings.

It is to be understood that both the foregoing general description and the following detailed description of the present embodiments of the invention are exemplary and explanatory, and are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
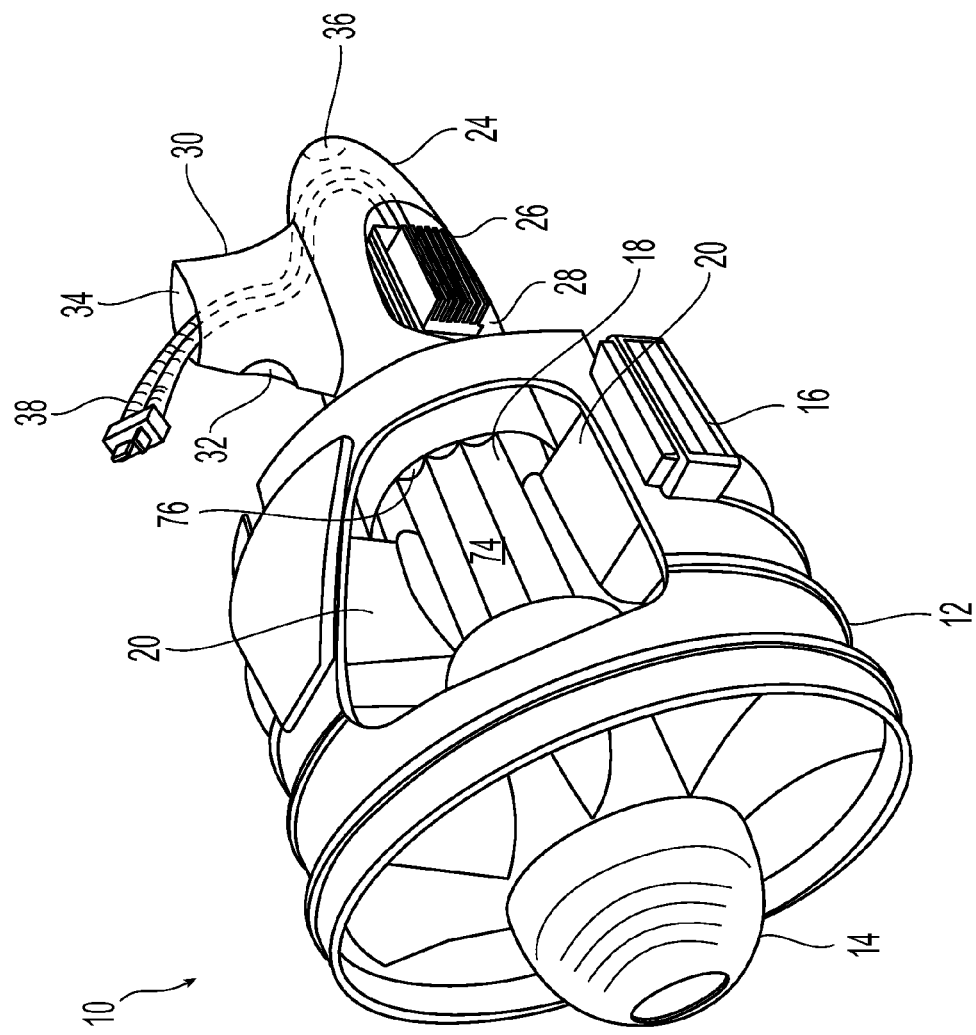
FIG. 1 is a partial cutaway perspective view of one embodiment of a power plant according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

Figure 2:
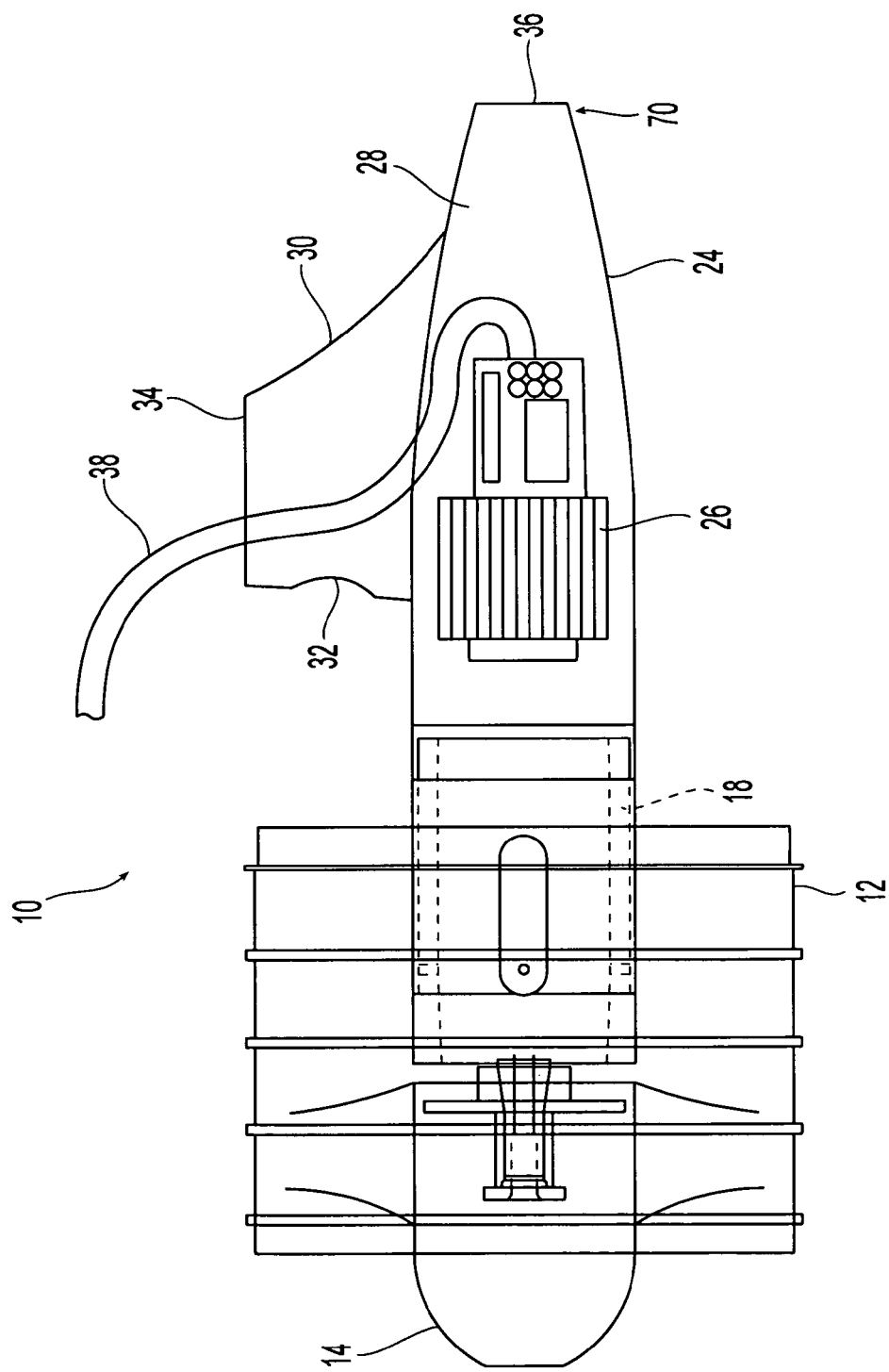
FIG. 2 is a schematic side view of the power plant of FIG. 1.
Figure 3:
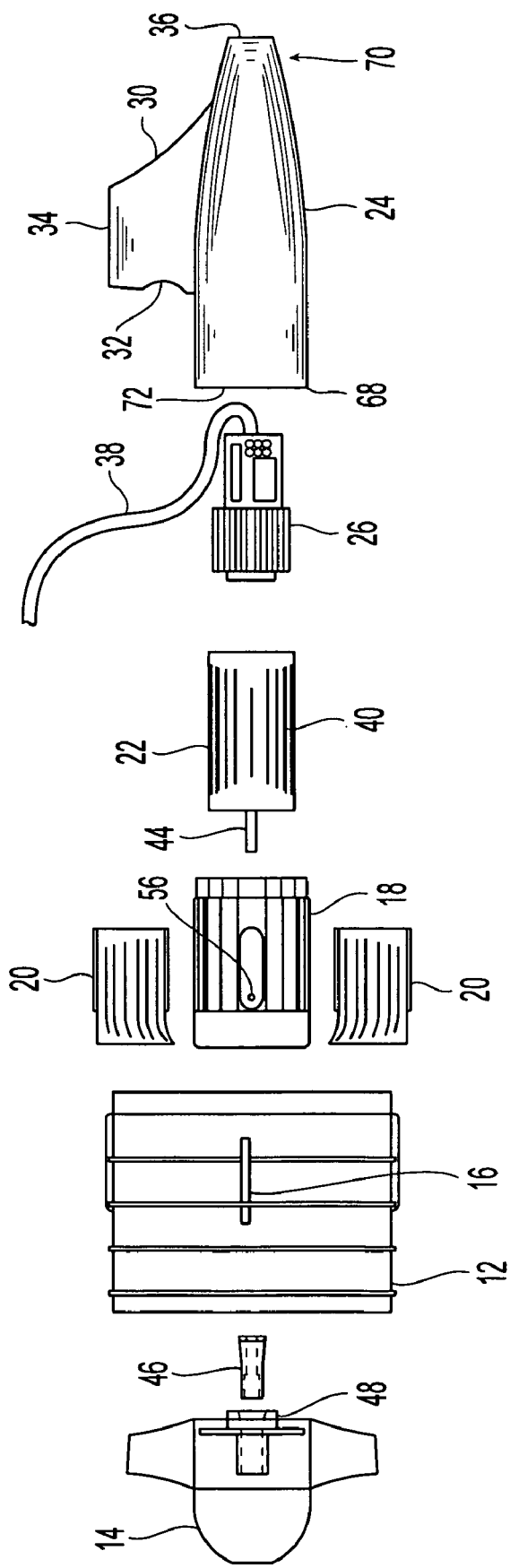
FIG. 3 is an exploded elevational view of the power plant of FIG. 1.

One embodiment of a power plant 10 for a model airplane, and more particularly jet-type model airplanes and UAVs, is illustrated in FIGS. 1 and 2. The power plant 10 can be secured into the interior of a model jet airplane (not shown) or UAV as a unit and connected by appropriate electrical connections to transponders for controlling the power plant 10 and therefore the vehicle. The power plant 10 has an outer shroud 12 with a fan rotor 14 rotationally mounted therein. The outer shroud 12 has mounting flanges 16 on either side to be mounted to the model jet airplane, but may be mounted in any appropriate manner. The power plant 10 also includes a metallic sleeve 18 that is operationally connected to the outer shroud 12 by stators 20. The metallic sleeve 18 preferably has inserted therein a electric motor 22, which is connected to the fan rotor 14 by a shaft and collet, as described in more detail below. The power plant 10 also includes a fairing 24, the fairing 24 connected to a rear end of the metallic sleeve 18. As illustrated in the cut out portion of the fairing 24 of FIG. 1, a electronic speed control member 26 is positioned in a longitudinal opening 28 of the fairing 24. The fairing 24 preferably has an airfoil-shaped pylon 30 extending radially outward therefrom, the airfoil-shaped pylon 30 preferably having two openings 32,34. The first opening 32 is for air to enter the airfoil-shaped pylon 30 (mainly from fan rotor 14) and pass into the longitudinal opening 28 of the fairing 24 and cool the electronic speed control member 26 as it passes through the fairing 24 and out a rear opening 36 of the fairing 24. The second opening 34 preferably at the top of the airfoil-shaped pylon 30 provides a route for the electrical conductors 38 that control the electronic speed control member 26 and the electric motor 22 during operation. The second opening 34 is preferably sealed to prevent air that enters in the front of fairing 24 and the first opening 32 from escaping therethrough. The second opening is preferably sealed with a grommet through which only the electrical conductors 38 pass.

Turning now to FIGS. 3 and 4A-C, in one embodiment, the electric motor 22 is inserted into the metallic sleeve 18. The metallic sleeve 18 is preferably made of aluminum, but any strong, lightweight material that helps to dissipate heat may be used. Preferably the electric motor 22 has very little clearance between the outer surface 40 of the electric motor and the inner surface 42 of the metallic sleeve 18 to allow for maximum heat transfer. In a preferred embodiment, a heat transfer grease is placed on the inner surface 42 of the metallic sleeve 18 (or on the outer surface 40 of the electric motor 22) prior to the electric motor 22 being inserted in the metallic sleeve 18. The electric motor 22 has a rotating shaft 44 that engages a collet 46 that in turn engages an opening 48 in the fan rotor 14 causing the fan rotor to rotate with the shaft 44. The electric motor 22 is preferably secured to the metallic sleeve 18 with four screws (not illustrated) that pass through screw openings 50 in the front face 52 of metallic sleeve 18 and engage corresponding threaded openings on the electric motor 22.

Figure 4C:
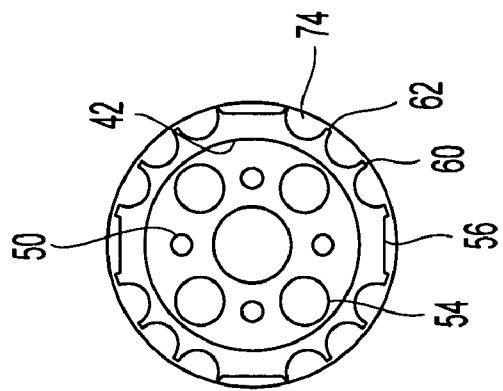
FIG. 4C is a rear view of the metallic sleeve.
Figure 4B:
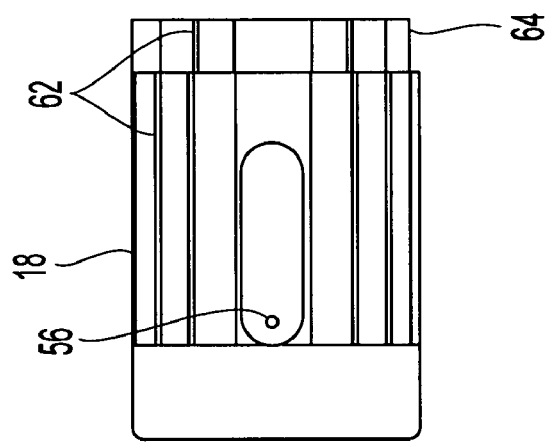
FIG. 4B is a side view of the metallic sleeve.
Figure 4A:
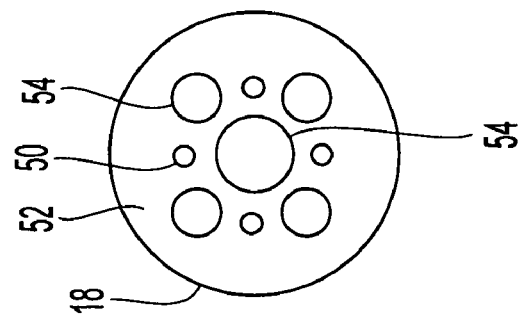
FIG. 4A is a front view of the metallic sleeve.

As best seen in FIG. 4A, the front face 52 of the metallic sleeve 18 preferably has a plurality of air holes 54 therein to allow air to flow from the fan rotor 14 through the air holes 54 and cool the electric motor 22 during operation. The metallic sleeve 18 also has four openings 56 on the outside where the stators 20 are secured to attach the outer shroud 12, preferably with screws or bolts. As seen in FIGS. 4B and 4C, the outer surface 58 of metallic sleeve 18 also has a plurality of fins 60, which help to dissipate heat generated by the electric motor 22. The plurality of fins 60 preferably run along the majority of the length of the metallic sleeve 18 and have an outer surface 62, which is the most radially outward position on the fins 60. It should also be noted that the electric motor 22, rather than having a smooth outer surface 40 may also have plurality of fins, rather than being inserted into a metallic sleeve 18.

Returning to FIG. 3, fairing 24 is an elongated member that has a longitudinal opening 28 that extends between a front end 68 and rear end 70. At the front end 68 is an opening 72 that accepts the rear end 64 of the metallic sleeve 18. The rear end 70 has a rear opening 36 to allow air that enters the fairing 24 to escape. As illustrated, it is preferably that the rear opening 36 is smaller in diameter than that of the opening 72 at the front end 68. As also illustrated, it is preferably that the diameter of the longitudinal opening 28 generally decreases from the front end 68 to the rear end 70. The longitudinal opening 28 of fairing 24 is sized to accept the rear end of the metallic sleeve 18 as well as the electronic speed control member 26.

The rear portion 64 of the metallic sleeve 18 preferably has a reduced diameter so that the outer surface 62 of the fins 60 preferably engage the inner surface of the longitudinal opening 28 of the fairing 24 at the front end 68. As best illustrated in FIG. 1, the plurality of fins 60 provide a plurality of troughs 74 that become openings 76 into the fairing 24 at the front end 68. Air from the fan rotor 14 passes over the metallic body 18 thereby cooling the metallic body 18, and electric motor 22, and enters into fairing 24 through the openings 76. The air passing into the fairing 24 through openings 76 also cools the electronic speed control member 26 as it passes out the opening 36.

Figure 5:
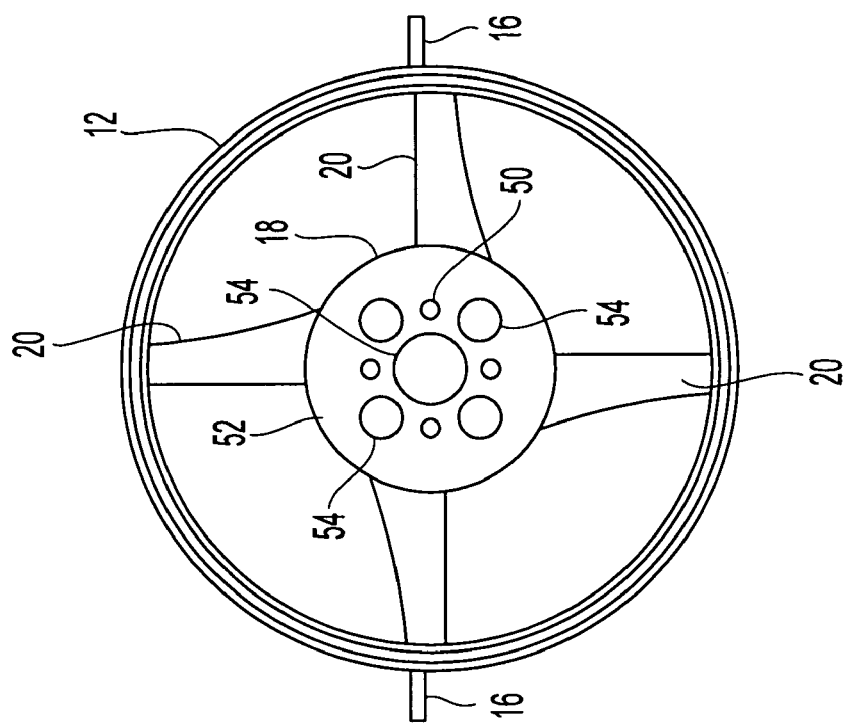
FIG. 5 is a front view of the shroud and metallic sleeve for the power plant of FIG. 1.

FIG. 5 is a front elevational view of the outer shroud 12 with the stators 20 connected thereto and also to the metallic sleeve 18. The mounting flanges 16 on the outer shroud 12 can also be seen. The screw openings 50 and air holes 54 in front face 52 of the metallic sleeve 18 can also be seen. While the openings and holes are distributed around the front face 52, they can have any pattern or be of any sizes or numbers and still be within the scope of the present invention.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A power plant for a model jet airplane comprising:
   an electric motor having a plurality of cooling fins circumferentially surrounding the electric motor, each of the cooling fins having an outer surface;
   a cover having an longitudinal opening extending between a front end and a rear end, the front end configured to receive the electric motor and cooling fins therein, the outer surface of the cooling fins engaging at least a portion of an inner surface of the cover, the rear end of the cover having an opening; and
   an electronic speed control member electrically connected to the electric motor and disposed within the longitudinal opening of the cover,
   wherein during operation air enters the front end of the cover between each of the cooling fins and a third opening in the cover between the front and rear ends to cool the electronic speed control member and exits the opening in the rear end of the cover.

2. The power plant for a model jet airplane according to claim 1, wherein the third opening is in an airfoil-shaped pylon extending radially outward from the cover.

3. The power plant for a model jet airplane according to claim 1, wherein the airfoil-shaped pylon has a fourth opening for electrical conductors to connect the electronic speed control member and electric motor to control elements.

4. The power plant for a model jet airplane according to claim 1, wherein the electric motor is inserted into a metallic sleeve, the metallic sleeve having a configuration to accept the electric motor in a tight-fitting manner and having a plurality of cooling fins around an exterior surface thereof.

5. The power plant for a model jet airplane according to claim 1, wherein the power plant is secured into the interior of a model jet airplane or UAV.

6. The power plant for a model jet airplane according to claim 1, wherein the electric motor has an outer casing with a plurality of cooling fins circumferentially spaced around the outer casing.

7. The power plant for a model jet airplane according to claim 1, further comprising a fan rotor operationally coupled to the electric motor.

8. A power plant for a model jet airplane comprising:
an electric motor having a plurality of cooling fins circumferentially surrounding the electric motor, each of the cooling fins having an outer surface;
a cover having an longitudinal opening extending between a front end and a rear end, the front end configured to receive only a portion of the electric motor and the plurality of cooling fins therein, a portion of the outer surface of the cooling fins engaging at least a portion of an inner surface of the cover at the front end creating a plurality of openings at the front end of the cover, and the rear end of the cover having an opening; and
an electronic speed control member electrically connected to the electric motor and disposed within the longitudinal opening of the cover between the electric motor and the rear end of the cover.

9. The power plant for a model jet airplane according to claim 8, further comprising openings at a front end of the electric motor to allow air to pass through the electric motor and into the cover.

10. The power plant for a model jet airplane according to claim 8, further comprising a fan rotor operationally coupled to the electric motor.

11. The power plant for a model jet airplane according to claim 10, wherein the electric motor has an outer casing, the plurality of cooling fins being circumferentially spaced around the outer casing.

12. The power plant for a model jet airplane according to claim 8, wherein the cover has a third opening between the front and rear ends, the third opening is in an airfoil-shaped pylon extending radially outward from the cover.

13. The power plant for a model jet airplane according to claim 12, wherein the airfoil-shaped pylon has a fourth opening for electrical conductors to connect the electronic speed control member and electric motor to control elements.

14. The power plant for a model jet airplane according to claim 8, wherein the electric motor is inserted into a metallic sleeve, the metallic sleeve having a configuration to accept the electric motor in a tight-fitting manner and having a plurality of cooling fins around an exterior surface thereof.

15. The power plant for a model jet airplane according to claim 8, wherein the power plant is secured into the interior of a model jet airplane or UAV.

16. An power plant for a model jet airplane comprising:
an electric motor having a plurality of cooling fins circumferentially surrounding the electric motor, each of the cooling fins having an outer surface;
an electronic speed control member electrically connected to the electric motor; and
a plurality of blades operationally connected to the electric motor;
wherein the plurality of cooling fins act as ports for air from the plurality of blades to cool the electronic speed control member during operation.

17. The power plant for a model jet airplane according to claim 16, wherein the electric motor is inserted into a metallic sleeve, the metallic sleeve having a configuration to accept the electric motor in a tight-fitting manner and having a plurality of cooling fins around an exterior surface thereof.

18. The power plant for a model jet airplane according to claim 16, wherein the power plant is secured into the interior of a model jet airplane or UAV.

19. The power plant for a model jet airplane according to claim 16, wherein the electric motor has an outer casing, the plurality of cooling fins being circumferentially spaced around the outer casing.

* * * * *